United States Patent
Ahn et al.

(10) Patent No.: US 8,913,208 B2
(45) Date of Patent: Dec. 16, 2014

(54) LIQUID CRYSTAL MODULE CAPABLE OF PREVENTING DISPLAY DEVICE FROM BEING DARKLY DISPLAYED

(75) Inventors: Sanghoon Ahn, Seoul (KR); Hyojin Kim, Gyeongbuk (KR); Jonghyeok Kim, Gumi-si (KR); Youngchul Jung, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 134 days.

(21) Appl. No.: 13/292,896

(22) Filed: Nov. 9, 2011

(65) Prior Publication Data

US 2012/0127391 A1    May 24, 2012

(30) Foreign Application Priority Data

Nov. 23, 2010   (KR) .................. 10-2010-0117002
Oct. 4, 2011   (KR) .................. 10-2011-0100498

(51) Int. Cl.
  *G02F 1/1333*   (2006.01)
(52) U.S. Cl.
  CPC ...... *G02F 1/133308* (2013.01); *G02F 2201/46* (2013.01)
  USPC .............. 349/58; 362/632; 362/633; 362/634
(58) Field of Classification Search
  CPC ................ G02F 2201/46; G02F 1/133615
  USPC .................................. 349/58; 362/600–634
  See application file for complete search history.

(56) References Cited

U.S. PATENT DOCUMENTS

| | | | |
|---|---|---|---|
| 8,730,425 B2* | 5/2014 | Ji et al. ............................ | 349/58 |
| 2003/0223020 A1* | 12/2003 | Lee ................................. | 349/58 |
| 2006/0171170 A1* | 8/2006 | Lee ................................. | 362/632 |
| 2011/0037920 A1* | 2/2011 | Kim et al. ...................... | 349/58 |
| 2011/0085107 A1* | 4/2011 | Noh et al. ...................... | 349/61 |

* cited by examiner

*Primary Examiner* — Richard Kim
*Assistant Examiner* — Kendrick Hsu
(74) *Attorney, Agent, or Firm* — Birch, Stewart, Kolasch & Birch, LLP

(57) ABSTRACT

A liquid crystal module includes a display panel having an active area; a case top configured to surrounds an edge of an upper surface and edges of a display panel, and having first through holes; a cover bottom configured to support a light guide plate disposed under the display panel; a supporter main configured to support the display panel and the cover bottom; a light source circuit board on which light emitting diodes (LEDs) emitting light to at least one of both sides of the light guide plate are mounted, wherein the light source circuit board is disposed on the supporter main; and fasteners configured to pass through the first through hole of the case top and to couple the case top with the supporter main, wherein at least two of the LEDs are disposed between the fasteners.

9 Claims, 10 Drawing Sheets

LIQUID CRYSTAL MODULE CAPABLE OF PREVENTING DISPLAY DEVICE FROM BEING DARKLY DISPLAYED

This application claims the benefit of Korean Patent Application No. 10-2010-0117002 filed on Nov. 23, 2010 and Korean Patent Application No. 10-2011-0100498 filed on Oct. 4, 2011. The entire contents of each of these applications are incorporated herein by reference for all purposes as if fully set forth herein.

BACKGROUND OF THE INVENTION

1. Field of the Invention

Embodiments of the invention relate to a liquid crystal module.

2. Discussion of the Related Art

A range of applications for liquid crystal displays has gradually widened because of its excellent characteristics such as light weight, thin profile, and low power consumption. Nowadays, the liquid crystal displays have been widely used in personal computers such as notebook PCs, office automation equipments, audio/video equipments, interior/outdoor advertising display devices, and the like. The liquid crystal display displays an image through controlling an electric field applied to a liquid crystal layer and modulating light incident from a backlight unit.

Figure 1:
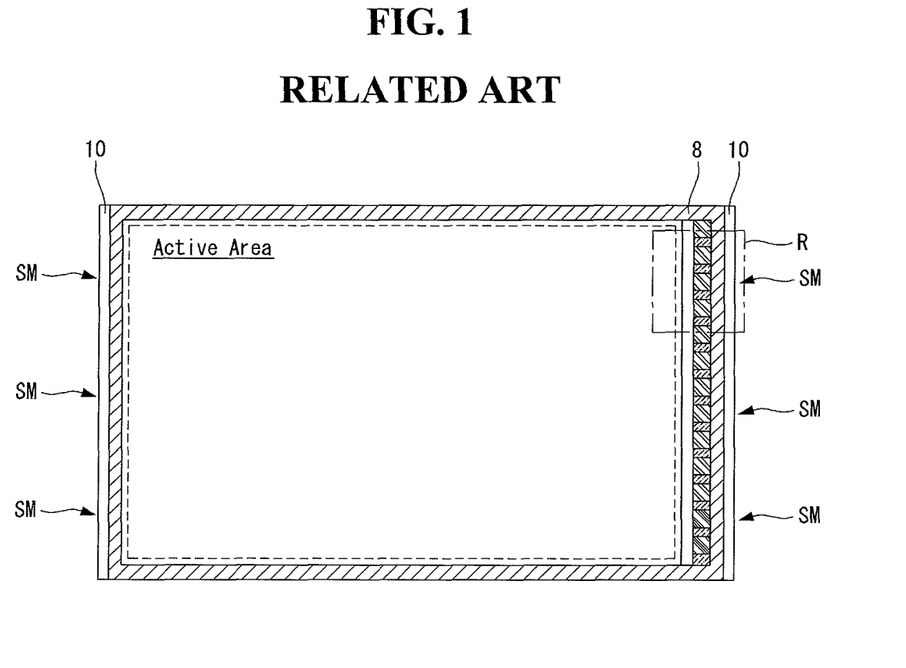
FIG. 1 is a plan view illustrating a related art liquid crystal module, in which the liquid crystal module having light emitting diodes (LEDs) is coupled with a system bracket.
Figure 2:
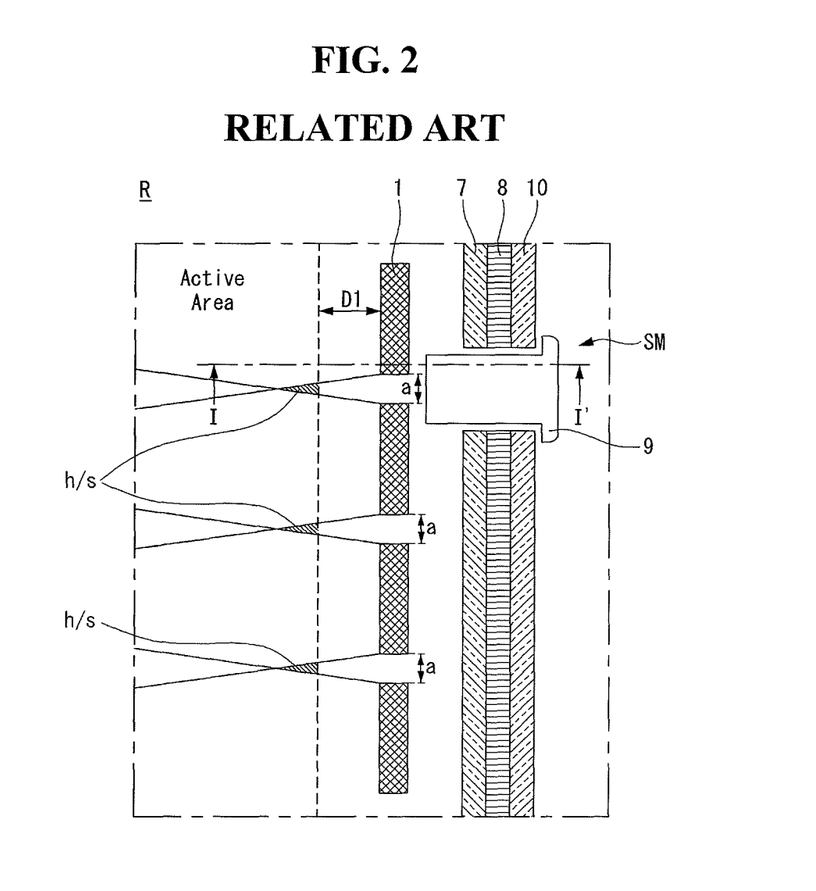
FIG. 2 is a plan view illustrates a portion R of the liquid crystal module shown in FIG. 1.
Figure 3:
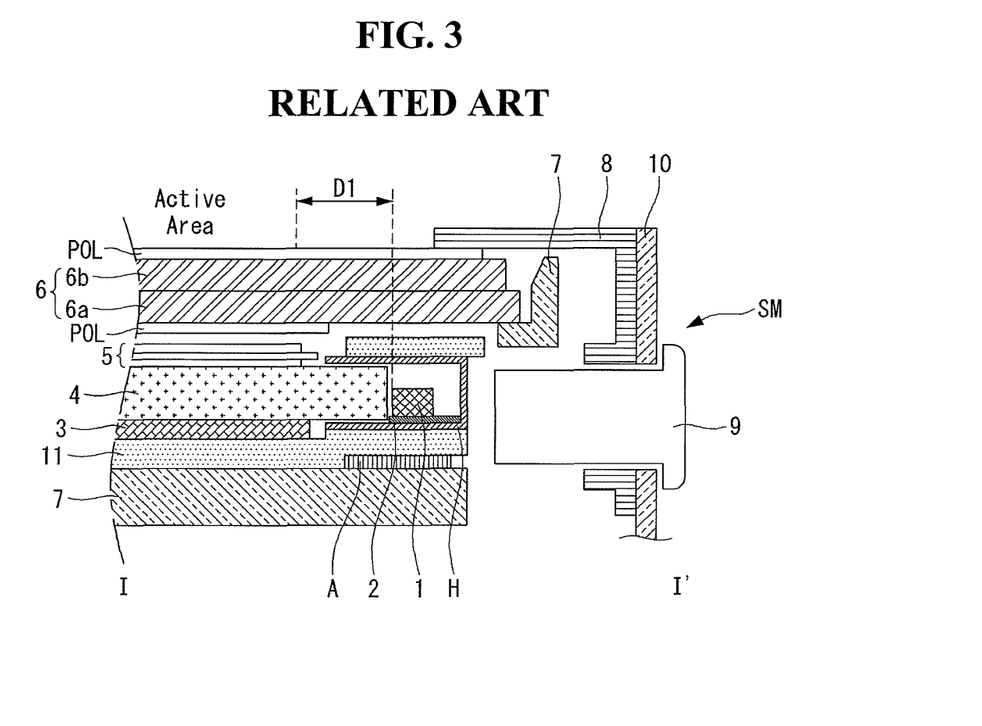
FIG. 3 is a cross-sectional view taken along line I-I' of FIG. 2; a plan view illustrating a portion of a liquid crystal module according to a first embodiment of the invention.

Hereinafter, a related art liquid crystal display will be described with reference to FIG. 1. FIG. 1 is a plane view illustrating a related art liquid crystal display, in which a liquid crystal module having light emitting diodes (LEDs) is coupled with a system bracket, FIG. 2 is a plan view illustrating a portion R of FIG. 1, in which hot spots of the liquid crystal module are viewed, and FIG. 3 is a cross-sectional view taken along I-I' line of FIG. 2.

The relate art liquid crystal module includes a liquid crystal display panel 6 displaying video data, driving circuits for the liquid crystal display panel 6, a backlight unit providing light to the liquid crystal display panel, and a guide/case member for supporting the liquid crystal display panel 6 and the backlight unit.

The liquid crystal display panel 6 includes a lower glass substrate 6a, an upper glass substrate 6b, and a liquid crystal layer (not shown) disposed between the lower and upper glass substrates 6a and 6b. The liquid crystal display panel 6 also includes an active area in which a plurality of data lines cross over a plurality of gate lines on the lower glass substrate 6a of the display panel 6. Though not shown, a plurality of liquid crystal cells are arranged in the active area in a matrix form formed by the cross of the plurality of data lines and the plurality of gate lines. Further, thin film transistors (TFTs), pixel electrodes of the liquid crystal cells connected to the TFTs, storage capacitors, etc. are formed in the active area. The liquid crystal cells are driven by an electric field generated by a voltage difference between a data voltage supplied to the pixel electrodes through the data lines and a common voltage supplied to common electrodes, and adjust the amount of light transmitted by the display panel 6.

Polarizing plates POL are respectively attached to the upper glass substrate 6b and the lower glass substrate 6a. Alignment layers (not shown) for setting a pre-tilt angle of liquid crystals in the inside surface contacting the liquid crystals are respectively formed on the upper glass substrate 6b and the lower glass substrate 6a.

The guide/case member includes a supporter main 7 and a case top 8 as shown in FIG. 3.

The supporter main 7 supports the display panel 6 and keeps a distance between the display panel 6 and optical sheets 5 constant. The supporter main 7 includes a screw through hole through which a screw 9 passes at a side mounting portion SM.

The case top 8 has a structure configured to surrounds an edge of an upper surface and edges of the liquid crystal display panel 6. Also, the case top 8 has a structure configured to surrounds an upper surface and side surfaces of the supporter main 7. Also, the case top 8 is coupled with a system bracket 10 using the screw 9 which passes thorough the screw through hole.

The backlight unit is mainly classified into a direct type backlight unit and an edge type backlight unit. The direct type backlight unit is configured to have a plurality of light sources disposed under the liquid crystal display panel. The edge type backlight unit is configured to have a plurality of light sources disposed to face side of a light guide plate. The edge type backlight unit includes light emitting diodes (LEDs) 1 light source circuit board 2, a reflector sheet 3, a light guide plate 4, optical sheets 5, a cover bottom 11 and a LED housing H. The edge type backlight unit converts light from the LEDs 1 into a uniform surface light source through the light guide plate 4 and the optical sheets 5 and provides the light to the display panel 6.

As shown in FIGS. 1 and 2, there are side mounting portions SM on both left and right sides of the liquid crystal module. The liquid crystal module can be assembled to the system bracket by fastening the screw 9 to the side mounting portion SM of the liquid crystal module. However, because positions of the side mounting portions SM and a size of the screw 9 are determined according to VESA (Video Electronics Standards Association) standard, the LED 1 must be spaced from the screw 9 in order to obviate mechanical interference between the screw 9 and LED 1. As a result, the LEDs 1 are positioned close to an active area of a display panel. Because a distance D1 between the LEDs 1 and the boundary of the active area of the display panel is short, light emitted from the LEDs 1 does not illustrate certain regions of the display panel to appear hot spots region h/s.

As used herein, the "hot spot area h/s" means arear that certain regions in the active area of the display panel appear darker than the other regions of the active area because the light beams emitted from LEDs 1 are not illustrated to the certain regions as shown in FIG. 2. Due to the hot spot, the image is not displayed uniformly.

SUMMARY OF THE INVENTION

An object of this invention is to provide a liquid crystal module that can prevent a display device from being partially darkly displayed.

Additional features and advantages of this invention will be set forth in the description which follows, and in part will be apparent from the description, or may be learned by practice of this invention. The objectives and other advantages of this invention will be realized and attained by the structure particularly pointed out in the written description and claims hereof as well as the appended drawings.

In one aspect, there is a liquid crystal module comprising a display panel having an active area; a case top configured to surrounds an edge of an upper surface and edges of a display panel, and having first through holes; a cover bottom configured to support a light guide plate disposed under the display panel; a supporter main configured to support the display panel and the cover bottom; a light source circuit board on which light emitting diodes (LEDs) emitting light to at least one of both sides of the light guide plate are mounted, wherein the light source circuit board is disposed on the supporter main; and fasteners configured to pass through the first through hole of the case top and to couple the case top with the supporter main, wherein at least two of the LEDs are disposed between the fasteners.

The liquid crystal module further including a system bracket configured to cover the case top, wherein the system bracket has second through holes, and the system bracket is coupled with the case top by the fastener passing through the first and second through holes.

In the liquid crystal module, the supporter main includes fastener inserting openings into which an end of each fastener is inserted and each of the fastener inserting openings surrounds the end of the fastener.

In the liquid crystal module, the light source circuit board is disposed on a bottom surface of the cover bottom.

In the liquid crystal module, at least one of an upper surface and a lower surface of the light guide plate have V-shape patterns.

In the liquid crystal module, the supporter main includes third through holes through which each fastener passes.

In the liquid crystal module, the light source circuit board includes fourth through holes through which each fastener passes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification.

Figure 4:
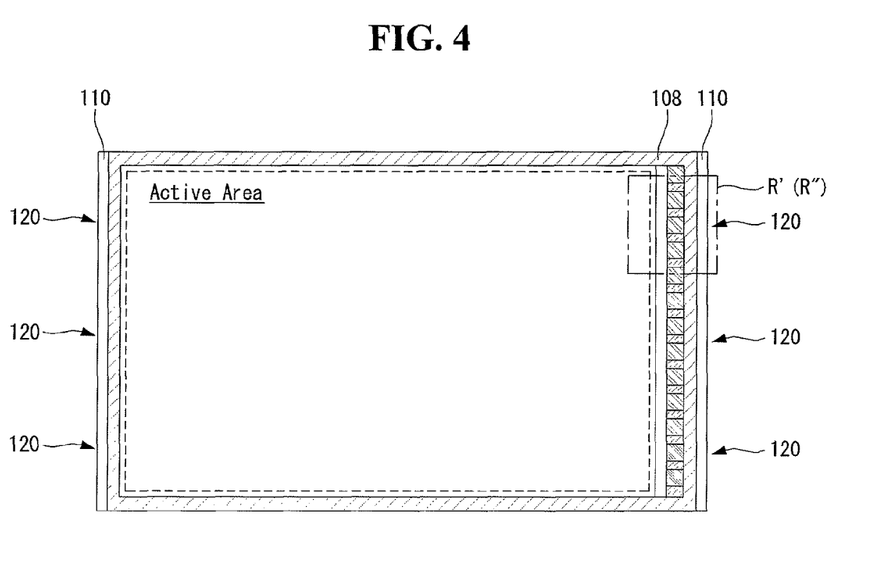
FIG. 4 is a plan view illustrating a portion of a liquid crystal module according to first and second embodiments of this invention cross-sectional view taken along line I-I' of FIG. 3.
Figure 5:
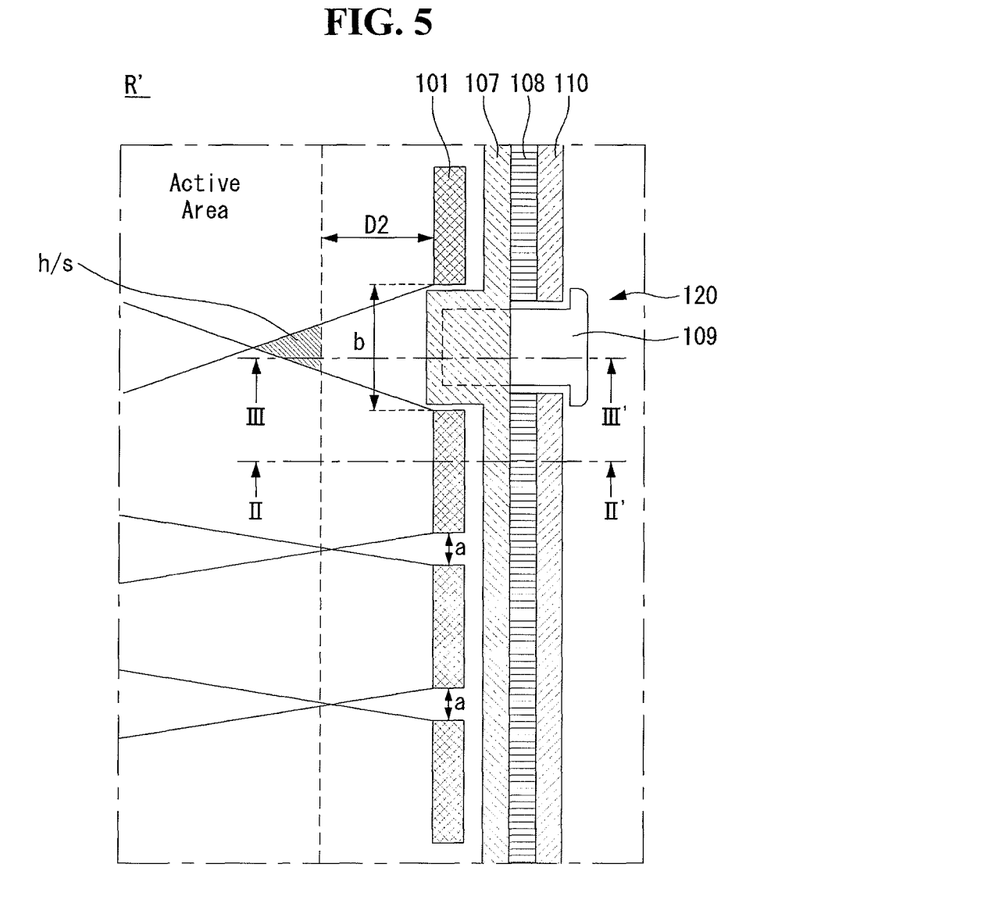
FIG. 5 is a plan view illustrates a portion R' of a liquid crystal module of FIG. 4 according to the first embodiment of this invention.
Figure 6:
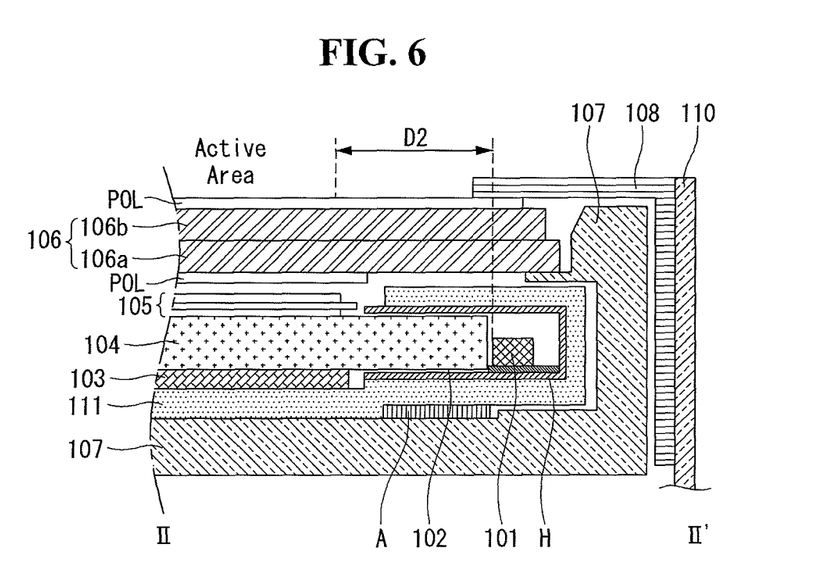
FIG. 6 is a cross-sectional view taken along line II-II' of FIG. 5.
Figure 7:
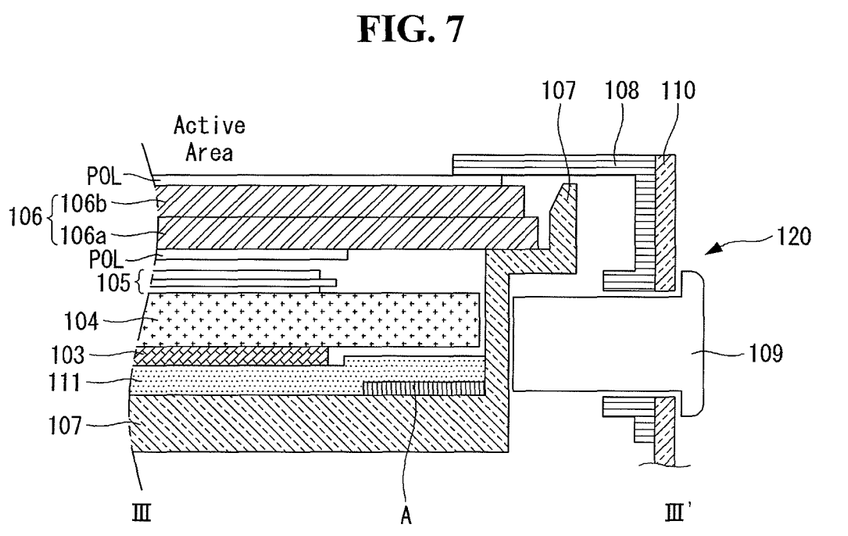
FIG. 7 is a cross-sectional view taken along line III-III' of FIG. 5.
Figure 8:
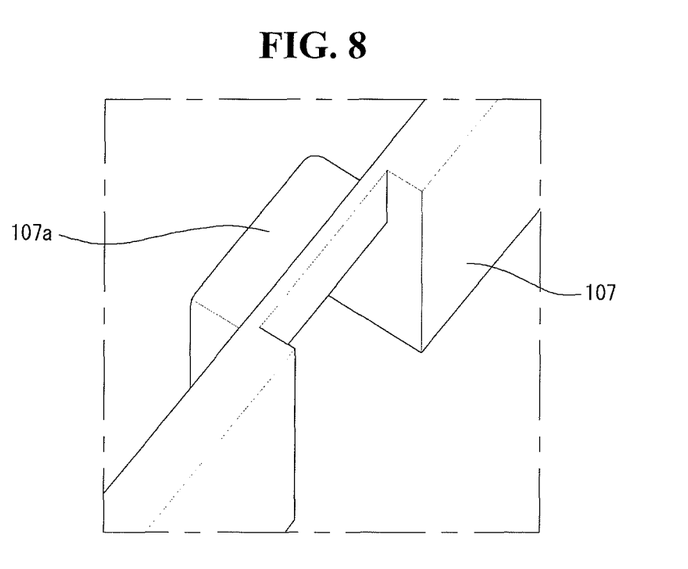
FIG. 8 is a perspective view illustrating a fastener inserting opening of a supporter main shown in FIG. 7.

FIGS. 4 to 8 are drawings illustrating a liquid crystal module according to a first embodiment of this invention. FIG. 4 is a plan view illustrating a portion of a liquid crystal module according to first and second embodiments of this invention cross-sectional view taken along line I-I' of FIG. 3, FIG. 5 is a plan view illustrates a portion R' of a liquid crystal module of FIG. 4, FIG. 6 is a cross-sectional view taken along line II-II' of FIG. 5, FIG. 7 is a cross-sectional view taken along line III-III' of FIG. 5 and FIG. 8 is a perspective view illustrating a fastener inserting opening of a supporter main shown in FIG. 7.

As shown in FIGS. 4-8, the liquid crystal module according to the first embodiment of the invention includes a display panel 106, driving circuits (not shown) of the display panel 106, a backlight unit, and a guide/case member supporting the backlight unit.

The display panel 106 includes an upper glass substrate 106b, a lower glass substrate 106a, and a liquid crystal layer between the upper and lower glass substrates 106b and 106a. The display panel 106 includes an active area in which a plurality of data lines cross over a plurality of gate lines on the lower glass substrate 106a of the display panel 106. Though not shown, a plurality of liquid crystal cells are arranged in the active area in a matrix form formed by the cross of the plurality of data lines and the plurality of gate lines. Further, thin film transistors (TFTs), pixel electrodes of the liquid crystal cells connected to the TFTs, storage capacitors, etc. are formed in the active area. The liquid crystal cells are driven by an electric field generated by a voltage difference between a data voltage supplied to the pixel electrodes through the data lines and a common voltage supplied to common electrodes, and adjust the amount of light transmitted by the display panel 106.

Black matrixes, color filters, the common electrodes, etc, are formed on the upper glass substrate 106b of the display panel 106. The common electrodes are formed on the upper glass substrate 106b in a vertical electric field driving manner such as a twisted nematic (TN) mode and a vertical alignment (VA) mode. In a horizontal electric field driving manner such as an in-plane switching (IPS) mode and a fringe field switching (FFS) mode, the common electrodes are formed on the lower glass substrate 106a along with the pixel electrodes. Polarizing plates POL are respectively attached to the upper glass substrate 106b and the lower glass substrate 106a. Alignment layers for setting a pre-tilt angle of liquid crystals in the inside surface contacting the liquid crystals are respectively formed on the upper glass substrate 106b and the lower glass substrate 106a.

The driving circuits of the display panel 106 include a gate driver, a data driver, and a timing controller. The data driver converts digital video data RGB into positive and negative analog data voltages using positive and negative gamma compensation voltages under the control of the timing controller. The data driver then supplies the positive and negative analog data voltages to the data lines. The gate driver sequentially outputs a gate pulse (or a scan pulse) having a width of about one horizontal period under the control of the timing controller and supplies the gate pulse to the gate lines. The timing controller receives the digital video data RGB and timing signals from a system board mounted with an external video source and supplies the digital video data RGB to the data driver. The timing controller generates a data control signal and a gate control signal for respectively controlling operation timing of the data driver and operation timing of the gate driver based on the timing signals. The driving circuits of the display panel 106 may be mounted on a printed circuit board.

The guide/case member includes a supporter main 107, a case top 108, etc.

The supporter main 107 supports the display panel 106 and keeps a distance between the display panel 106 and optical sheets 105 constant. The supporter main 107 is manufactured from high strength steel. For example, the supporter main 107 may be manufactured from electrolytic galvanized iron (EGI), steel use stainless (SUS), galvalume steel coil (SCLC), aluminum coated steel (ALCOSTA), and steel plated tin (SPTE). The supporter main 107 includes fastener inserting openings 107a at a side mounting portion 120 protruding from the supporter main 107. The fastener inserting opening 107a is configured so that it can receive and enclose an end of the fastener 109, such as hook, screw, pin. Hence, foreign materials can be prevented from being introduced into the liquid crystal module because the fastener inserting opening 107a is not passed through but enclosed.

The case top 108 is manufactured from electrolytic galvanized iron (EGI), steel use stainless (SUS), etc., and surrounds the sides and an upper edge of the display panel 106. Further, the case top 108 surrounds an upper surface and the sides of the supporter main 107. The case top 108 has a through hole corresponding to the fastener inserting opening 107a so that the supporter main 107 and the case top 108 are assembled using fasteners 109 to form an integral body. Further, a system bracket 110 is assembled to the supporter main 107 and the case top 108 at the side mounting portion 120 using the fasteners 109. The system bracket 110 has the structure capable of covering the case top 108, so as to protect the liquid crystal module.

The backlight unit is implemented as an edge type backlight unit. The backlight unit includes LED package including LEDs 101 and a light source circuit board 102, a reflector sheet 103, a light guide plate 104, optical sheets 105, a cover bottom 111, a LED housing H, etc. The edge type backlight unit converts light from the LEDs 101 into a uniform surface light source through the light guide plate 104 and the optical sheets 105 and provides the light to the display panel 106.

The first embodiment of the invention describes a backlight unit, in which the LED package is disposed only on the right side of the light guide plate 104, but is not limited thereto. For example, the LED package may be disposed on both sides of the light guide plate 104, or only on one side of the light guide plate 104.

The LEDs 101 according to the first embodiment of the invention emits light from a side thereof to the at least one side of the light guide plate 104. As shown in FIG. 6, the light source circuit board 102 on which the LEDs 101 are mounted, is attached to a bottom surface of the LED housing H attached to the cover bottom 111. A circuit for electrically connecting the LEDs 101 to a light source driver is formed on the light source circuit board 102. The light source circuit board 102 may be manufactured as a printed circuit board (PCB) or a flexible printed circuit board (FPC).

As shown in FIG. 5, the LEDs 101 according to the first embodiment of the invention are disposed on the same line as the fasteners 109. Thus, the distance between D2 the LEDs 101 and boundary line of the active area of the display panel 106 is larger than the distance D1 between the LED 1 and the active area of the related art. As a result, the hot spot area h/s appeared in the active area can be significantly decreased, thus an image can be displayed more uniformly. Since the distance D2 is larger than the distance D1, the LEDs 101 according to the first embodiment of the invention emits light having a luminous intensity greater than the related art liquid crystal module, thus the number of LEDs may be reduced, and the manufacturing cost may be reduced correspondingly. The luminous intensity of the LEDs 101 depends on the size of the display panel 106 and the distance D2 between the LEDs 101 and the boundary line of the active area, and may be determined by a preliminary experiment.

Figure 12:
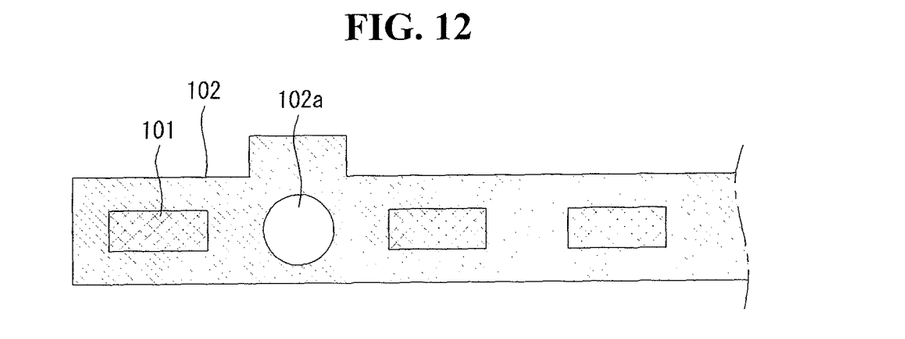
FIG. 12 is a side view illustrating a through hole of the light source circuit board shown in FIG. 11.

Further, in the liquid crystal module according to the first embodiment of the invention, LEDs are not disposed at areas where the fastener inserting openings are existed as shown in FIG. 5. Accordingly, a distance 'b' between the LEDs 101, which are positioned with the fastener inserting opening 107a interposed therebetween, is larger than a distance 'a' between the LEDs 101, which are positioned with no fastener inserting opening 107a being interposed therebetween. Thus, as shown in FIG. 12, the hot spot h/s may be generated because the distance 'b' of the neighboring LEDs 101 is larger than the distance 'a' by the fastener inserting opening 107a interposed therebetween. Since the distance "b" is larger than the distance "a", the hot spot area h/s may be generated in the active area according to the position of the fastener inserting opening 107a as shown in FIG. 5. However, the number of the hot spot area h/s is much less than that of the related art because the number of the side mounting portion 120 required by the VESA standard is much less than that of the LED 101. For the hot spot area h/s generated in the active area corresponding to the side mounting portion 120, the present invention further provides a light guide plate 104, whose upper surface and/or lower surface go through pattern processing to have a V-shape. The light guide plate 104 having the V-shaped upper surface and/or the V-shaped lower surface may further diffuse light from the LEDs 101.

The light guide plate 104 converts light from the LEDs 101 into the surface light source and provides the light to the display panel 106. The reflector sheet 103 is disposed under the light guide plate 104 and reflects light, which travels downward from the light guide plate 104, to the display panel 106. The optical sheets 105 are disposed between the light guide plate 104 and the display panel 106. The optical sheets 105 include at least one prism sheet and at least one diffusion sheet. Hence, the optical sheets 105 diffuse light incident from the light guide plate 104 and refract a travel path of light at an angle substantially vertical to a light incident surface of the display panel 106. The optical sheets 105 may further include a dual brightness enhancement film (DBEF) to enhance light transmission.

The cover bottom 111 is configured to fix the light guide plate 104 and support the lower part of the backlight unit. The cover bottom 111 is supported by the supporter main 107. The LED housing H is attached to the cover bottom 111 and smoothly dissipates heat generated in the LEDs 101 and the light source circuit board 102 to the outside. The LED housing H may contain a material having a high heat transfer rate. For example, the LED housing H may be manufactured using an aluminum-based metal plate such as aluminum (Al) and aluminum nitride (AlN), or using copper plate. Further, the aluminum-based metal plate or the copper plate may be coated with a high conductive material capable of accelerating the heat transfer.

Figure 9:
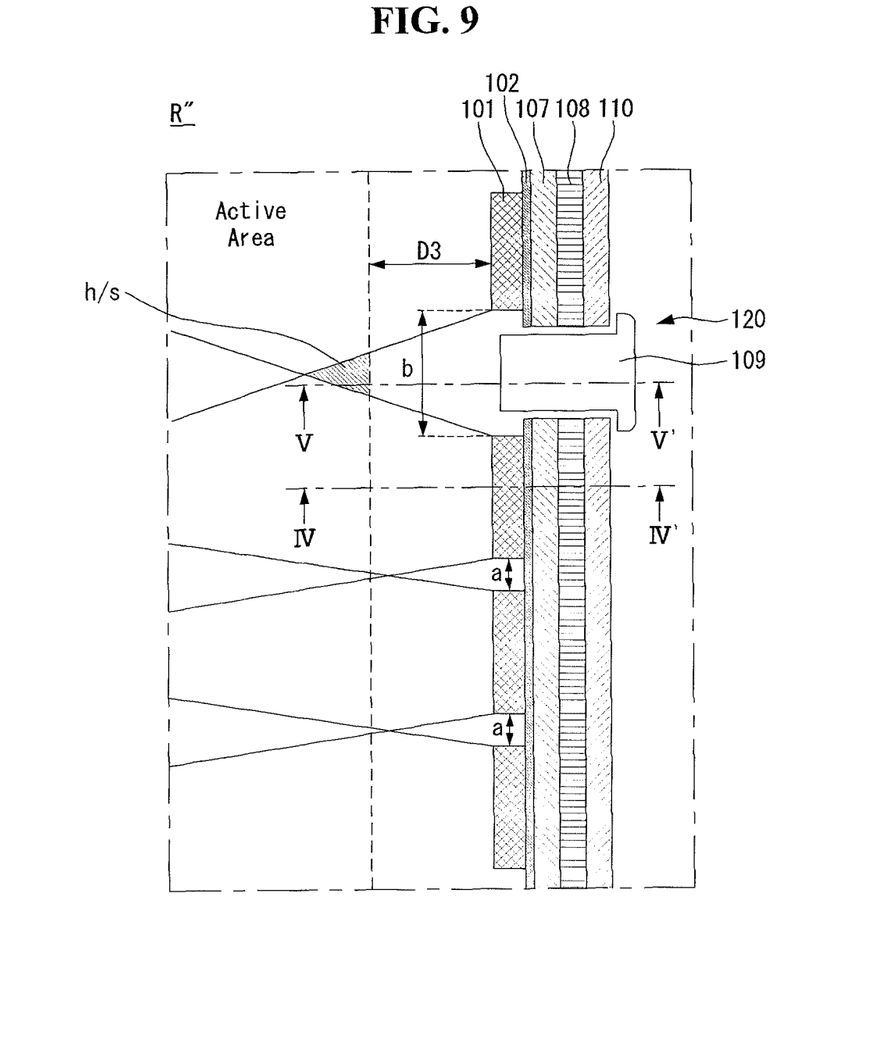
FIG. 9 is a plan view illustrates a portion R" of a liquid crystal module of FIG. 4 according to the second embodiment of this invention.
Figure 10:
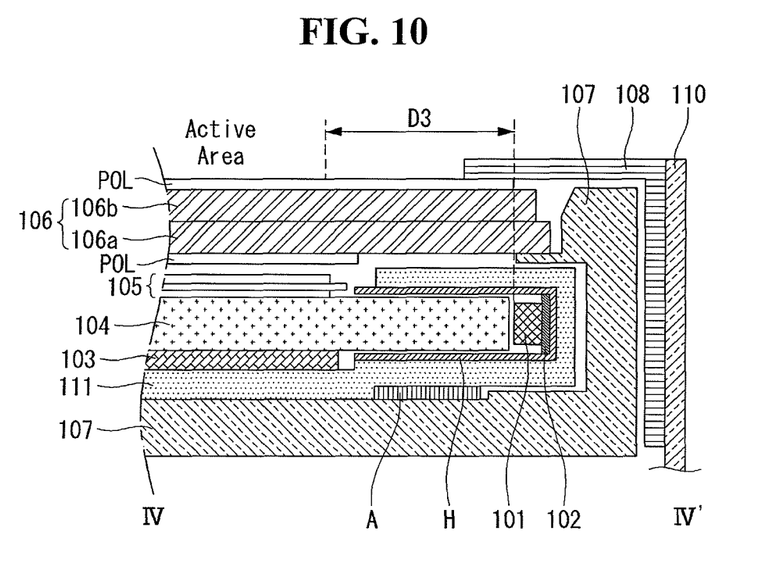
FIG. 10 is a cross-sectional view taken along line IV-IV' of FIG. 9.
Figure 11:
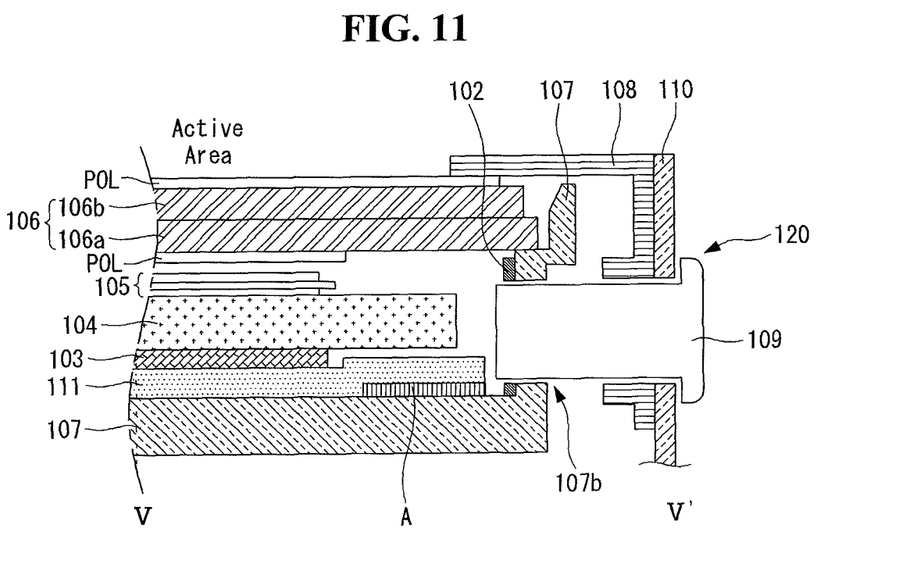
FIG. 11 is a cross-sectional view taken along line V-V' shown in FIG. 9.

FIGS. 9 to 12 are drawings illustrating a liquid crystal module according to a second embodiment of this invention. FIG. 9 is a plan view illustrating a portion R" of a liquid crystal module according to a second embodiment of the invention, FIG. 10 is across-sectional view taken along line IV-IV' of FIG. 9, FIG. 11 is across-sectional view taken along line V-V' of FIG. 9, and FIG. 12 is a side view illustrating a light source circuit board shown in FIG. 11.

As shown in FIGS. 9 to 12, the liquid crystal module according to the second embodiment of the invention includes a display panel 106, driving circuits (not shown) of the display panel 106, a backlight unit, and a guide/case member supporting the backlight unit. Since the display panel 106 and the driving circuits of the display panel 106 were described in the first embodiment of the invention, a further description may be briefly made or may be entirely omitted.

The guide/case member includes a supporter main 107, a case top 108, etc.

The supporter main 107 supports the display panel 106 and keeps a distance between the display panel 106 and optical sheets 105 constant. The supporter main 107 is manufactured from high strength steel. For example, the supporter main 107 may be manufactured using electrolytic galvanized iron (EGI), steel use stainless (SUS), galvalume steel coil (SGLC), aluminum coated steel (ALCOSTA), and steel plated tin (SPTE). As shown in FIG. 10, the supporter main 107 includes through holes 107b at a side mounting portion 120. The through hole 107b is configured so that the fastener 109 smoothly passes through the supporter main 107.

The case top 108 is manufactured from electrolytic galvanized iron (EGI), steel use stainless (SUS), etc, and surrounds the sides and an upper edge of the display panel 106. Further, the case top 108 surrounds an upper surface and the sides of the supporter main 107. The case top 108 has a through hole corresponding to the through hole 107b so that the supporter main 107 and the case top 108 are assembled using fasteners 109 to form an integral body. Further, a system bracket 110 can be assembled to the supporter main 107 and the case top 108 at the side mounting portion 120 using the fasteners 109. The system bracket 110 has the structure capable of covering the case top 108, so as to protect the liquid crystal module.

The backlight unit is implemented as an edge type backlight unit. The backlight unit includes LED package having a LEDs 101 and a light source circuit board 102, a reflector sheet 103, a light guide plate 104, optical sheets 105, a cover bottom 111, a LED housing H, etc.

The LEDs 101 according to the second embodiment of the invention emit light from top surface of thereofto at least one side of the light guide plate 104. As shown in FIG. 10, the light source circuit board 102, on which the LEDs 101 are mounted, is attached to a side surface of the LED housing H attached to an inner surface of the cover bottom 111. A circuit for electrically connecting the LEDs 101 to a light source driver is formed on the light source circuit board 102. The light source circuit board 102 may be manufactured as a printed circuit board or a flexible printed circuit board. As shown in FIG. 12, the light source circuit board 102 has a through hole 102a at a position corresponding to the through hole 107b, so that the fastener 109 can smoothly pass through the light source circuit board 102.

In the related art liquid crystal module, to obviate a mechanical interference between the LEDs 101 and the fastener of the side mounting portion, the LEDs are positioned near to the active area. On the contrary, as shown in FIG. 9, the LEDs 101 according to the second embodiment of the invention are disposed on the same line as the fasteners 109. Thus, the distance D3 between the LEDs 101 and boundary line of the active area of the display panel 106 is larger than the distance D1 between the LED 1 and the active area of the related art. As a result, the hot spot area h/s appeared in the active area can be significantly decreased, thus an image can be displayed more uniformly. Since the distance D3 is larger than the distance D1, the LEDs 101 according to the second embodiment of the invention emits light having a luminous intensity greater than the related art liquid crystal module, thus the number of LEDs may be reduced, and the manufacturing cost may be reduced correspondingly. The luminous intensity of the LEDs 101 depends on the size of the display panel 106 and the distance D3 between the LEDs 101 and the boundary line of the active area, and may be determined by a preliminary experiment.

Furthermore, in the liquid crystal module according to the second embodiment of the invention, LEDs are not disposed at areas where the fastener inserting openings are existed as shown in FIG. 9. Accordingly, a distance 'b' between the LEDs 101, with the through hole 107b interposed therebetween, is larger than a distance 'a' between the LEDs 101, with no through hole 107b interposed therebetween. In this embodiment, as shown in FIG. 9, the hot spot area h/s may be generated because the distance 'b' of the neighboring LEDs 101 is larger than the distance 'a' by the fastener inserting opening 107a interposed therebetween. For the hot spot area h/s generated in the active area corresponding to the side mounting portion 120, the present invention provides a light guide plate 104, of which an upper surface and/or a lower surface of the light guide plate 104 is formed to have a V-shape. The light guide plate 104 having the V-shaped upper surface and/or the V-shaped lower surface may further diffuse light from the LEDs 101.

The light guide plate 104 converts light from the LEDs 101 into the surface light source and provides the light to the display panel 106. The reflector sheet 103 is disposed under the light guide plate 104 and reflects light, which travels downward from the light guide plate 104, to the display panel 106. The optical sheets 105 are disposed between the light guide plate 104 and the display panel 106. The optical sheets 105 include at least one prism sheet and at least one diffusion sheet. Hence, the optical sheets 105 diffuse light incident from the light guide plate 104 and refract a travel path of light at an angle substantially vertical to a light incident surface of the display panel 106. The optical sheets 105 may further include a dual brightness enhancement film (DBEF) to enhance light transmission.

The cover bottom 111 is configured to fix the light guide plate 104, and supports the lower part of the backlight unit. The cover bottom 111 is supported by the supporter main 107. The LED housing H is attached to the cover bottom 111 and smoothly dissipates heat generated in the LEDs 101 and the light source circuit board 102 to the outside. The LED housing H may contain a material having a high heat transfer rate. For example, the LED housing H may be manufactured from an aluminum-based metal plate such as aluminum (Al) and aluminum nitride (AlN), or from copper. Further, the aluminum-based metal plate may be coated with a high conductive material capable of accelerating the heat transfer.

As described above, in the liquid crystal module according to the example embodiments of the invention, the LEDs are not disposed at areas where the fastener inserting openings are existed as shown in FIGS. 5 and 9. Accordingly, the number of the hot spot area h/s is much less than that of the related art because the number of the side mounting portion 120 required by the VESA standard is much less than that of the LED 101. Further, although the hot spot area h/s is generated, it is possible to prevent the hot spot area h/s from being generated in the active area of the liquid crystal module by forming V-shape patterns on upper surface and/or lower surface of the light guide plate.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal module comprising:
a display panel having an active area;
a case top configured to surround an edge of an upper surface and edges of the display panel, and having first through holes;
a system bracket configured to cover the case top to protect the liquid crystal module;
a cover bottom configured to support a light guide plate disposed under the display panel;
a supporter main configured to support the display panel and the cover bottom;
a light source circuit board on which light emitting diodes (LEDs) emitting light to at least one of both sides of the light guide plate are mounted, wherein the light source circuit board is disposed on an inner side of the supporter main;
fasteners configured to pass through the first through holes of the case top and system bracket and to couple the case top with the system bracket and the supporter main, at least two of the LEDs being disposed between the fasteners; and
a protruding portion of the supporter main formed between first and second light emitting diodes and including an interior region in which a front portion of a first fastener is inserted, the protruding portion including side edges and a front edge to form the interior region of the protruding portion, a distance between the side edges being substantially equal to a first distance between the first and second light emitting diodes,
wherein the protruding portion of the supporter main surrounds, via the side edges and the front edge, all surface areas of the fasteners that pass through the first through holes and extend beyond the case top, and
wherein the first distance between the first and second light emitting diodes is larger than a second distance between third and fourth light emitting diodes, and there is no fastener between the third and fourth light emitting diodes.

2. The liquid crystal module of claim 1, further comprising a system bracket configured to cover the case top, wherein the system bracket has second through holes, and the system bracket is coupled with the case top by the first fastener passing through the first and second through holes.

3. The liquid crystal module of claim 1, wherein the supporter main includes fastener inserting openings into which an end of each fastener is inserted.

4. The liquid crystal module of claim 3, wherein each of the fastener inserting openings surrounds the end of the fastener.

5. The liquid crystal module of claim 3, wherein the light source circuit board is disposed on a bottom surface of the cover bottom.

6. The liquid crystal module of claim 1, wherein the supporter main includes third through holes through which each fastener passes.

7. The liquid crystal module of claim 6, wherein the light source circuit board includes fourth through holes through which each fastener passes.

8. The liquid crystal module of claim 1, wherein the cover bottom surrounds a lower surface, side surfaces and edges of an upper surface of the light guide plate.

9. The liquid crystal module of claim 1, wherein at least four of the LEDs are disposed between the fasteners.

* * * * *